UNITED STATES PATENT OFFICE 2,491,222

CORROSION INHIBITOR

Herschel G. Smith, Wallingford, and Troy L. Cantrell and William L. McClintock, Jr., Lansdowne, Pa., assignors to Gulf Oil Corporation, Pittsburgh, Pa., a corporation of Pennsylvania No Drawing. Application January 7, 1946, Serial No. 639,702

8 Claims. (Cl. 252—75)

This invention relates to an improved corrosion inhibitor useful for inhibiting corrosion of metal parts coming into contact with aqueous fluids. More particularly, this invention is concerned with a composition for inhibiting corrosion in the cooling systems of internal combustion engines to which a freezing point depressant has been added.

In the cooling systems of internal combustion engines or in other heat-exchanging systems, the aqueous liquid which contacts the metal parts ordinarily causes rust or corrosion which deteriorates the metal. When monohydric and polyhydric alcohols are used as freezing point depressants in cooling systems in dilution with water, a corrosive action is induced under conditions of use, although the alcohols themselves are not considered corrosive. It has therefore been generally recognized that metals in contact with anti-freeze solutions require protection against corrosion, and various inhibiting agents have heretofore been used for this purpose. However, many of the inhibitors afford only partial protection, and it is desirable that more satisfactory compositions be used.

It is an object of this invention to provide a composition of matter which may safely be added to the aqueous contents of heating or cooling systems and which will minimize the corrosion that would otherwise occur.

It is a further object of this invention to provide improved corrosion inhibiting compositions which will maintain substantially non-corrosive conditions within a cooling system employing an antifreeze.

These and other objects are accomplished by the present invention wherein the sodium salt of 2-ethyl-hexyl, 3-methyl-butyl orthophosphoric acid is used for inhibiting the corrosion of metals in contact with aqueous fluids.

The 2-ethyl-hexyl, 3-methyl-butyl orthophosphoric acid has the following formula:

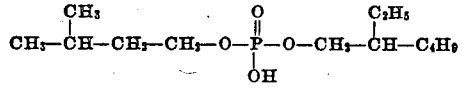

As disclosed in the copending application of Smith and Cantrell, Serial No. 583,656, filed March 19, 1945, now Patent No. 2,441,295, the acid may be prepared by reacting equimolecular proportions of 3-methyl-butanol-1 and 2-ethyl-hexanol-1 with phosphorus pentoxide ($P_2O_5$). The water soluble salts of the present invention may be prepared by reacting the acid with the selected inorganic base.

To prepare non-corrosive aqueous fluids in accordance with this invention, a small proportion, for example, from 0.01 per cent to 1.0 per cent by weight of the sodium salt of 2-ethyl-hexyl, 3-methyl-butyl orthophosphoric acid is added to an aqueous fluid such as water or an aqueous solution of ethanol, ethylene glycol, or the like.

While not essential to the corrosion inhibiting effect of the inhibitor of this invention, it is desirable to maintain the pH of the aqueous fluid between 7 and 9. To this end an alkaline substance such as sodium carbonate, trisodium phosphate, or sodium silicate may be added to impart reserve alkalinity and to guard against the development of severe acid conditions in use. In this connection, the addition of an alkaline substance in conjunction with the corrosion inhibitor is particularly useful for treating aqueous fluids containing an alcohol anti-freeze, which have developed acidity and have become corrosive in use. For example, a used aqueous ethylene glycol solution may be treated with sodium carbonate to neutralize the acidity which has developed in use, and then about 0.5 per cent by weight of the sodium salt of 2-ethyl-hexyl, 3-methyl-butyl orthophosphoric acid may be added. The resulting solution is non-corrosive and retains its antifreeze properties.

Additions of other materials well known in the art, may be made without departing from the spirit of this invention. For example, dyes and anti-leak agents may be added.

The corrosion inhibitor of this invention may be incorporated into an anti-freeze composition containing an alcohol as the freezing point depressant and the resulting composition may be used with excellent results as a non-corrosive anti-freeze liquid in cooling systems employing water. In view of the dilution of the alcohol by water to from about 50 per cent to 10 per cent by weight of the alcohol in use, the corrosion inhibitor is added to the alcohol in such proportion that the final cooling fluid containing the alcohol, water and corrosion inhibitor will contain from 0.01 per cent to 1.0 per cent by weight of the latter. Thus, there may be added to the alcohol from 0.2 per cent to 2.0 per cent by weight of corrosion inhibitor based on the alcohol. As a specific example, an anti-freeze composition in accordance with this invention contained ethylene glycol and 0.5 per cent by weight of corrosion inhibitor based on the glycol. In another example, the anti-freeze contained ethyl alcohol and 0.4 per cent by weight of corrosion inhibitor based on the alcohol. In lieu of the ethylene glycol and ethyl alcohol, other water-soluble alcohols such as methanol, propanol, propylene glycol, diethylene glycol, and glycerol may be used as the freezing point depressant.

The efficacy of the sodium salts of 2-ethyl-hexyl, 3-methyl-butyl orthophosphoric acid as a corrosion inhibitor is readily demonstrated by the following drastically accelerated corrosion test. In several containers, highly polished steel strips are completely submerged in an aqueous fluid such as water or a solution of an alcohol in water. About 1 per cent of the sodium salt of 2-ethyl-hexyl, 3-methyl-butyl orthophosphoric acid is added to some of the containers and not to others. Moist air is bubbled through the liquid in the containers at a rate of two liters per hour, while maintaining the temperature of the liquid at about 160° F. The test is continued for twelve days, and the liquid level in the containers is maintained at approximately the same height by the periodic addition of more of the original liquid. At the end of the twelve day period no rust or corrosion can be found on any of the metal strips in the containers to which the corrosion inhibitor of this invention is added. On the other hand, where the inhibitor is omitted, evidence of corrosion is apparent in some cases as soon as one hour after the test is started; and at the end of twelve days, corrosion is so marked that at times the metal strip is disintegrated.

While the amounts of corrosion inhibitor to add to an aqueous fluid have been shown to range from 0.01 per cent to 1.0 per cent, an excess of the corrosion inhibitor may be used without harmful effect. It is uneconomical to use too great an excess, but the amount used should be sufficient to inhibit corrosion of the metal parts contacted by the aqueous fluid. The minimum amount of corrosion inhibitor to use may readily be determined by one skilled in the art by following the accelerated corrosion test set forth in the paragraph next preceding.

The corrosion inhibitor may be added in various ways to the aqueous fluids which contact the metal parts which it is desired to protect. For example, the corrosion inhibitor per se in the desired amount may be added directly to the aqueous fluid, where it will dissolve and circulate throughout the system. Alternatively, a solution of the corrosion inhibitor in water or in an anti-freeze may be prepared in such concentration that upon addition to the system containing the aqueous fluid, dilution will yield the desired concentration. As another alternative, the aqueous fluid may initially be made up with the desired concentration of corrosion inhibitor and introduced into the system to be protected.

The use of the corrosion inhibitor of this invention is not limited to cooling systems containing alcohol freezing point depressants. The corrosion inhibitor may be used to good effect in any aqueous fluid which contacts metal parts, such as in various hydraulic systems, refrigeration systems and the like.

What we claim is:

1. A non-corrosive liquid consisting essentially of a liquid selected from the class consisting of water and water-soluble alcohols and containing a corrosion inhibiting amount of the sodium salt of 2-ethyl-hexyl, 3-methyl-butyl orthophosphoric acid.

2. A non-corrosive liquid consisting essentially of water and containing a freezing point depressing amount of a water-soluble alcohol and at least 0.01 per cent by weight of the sodium salt of 2-ethyl-hexyl, 3-methyl-butyl orthophosphoric acid.

3. A non-corrosive liquid consisting essentially of water and containing at least 0.01 per cent by weight of the sodium salt of 2-ethyl-hexyl, 3-methyl-butyl orthophosphoric acid.

4. A non-corrosive anti-freeze liquid consisting essentially of a water-soluble alcohol and from 0.2 to 2.0 per cent by weight of the sodium salt of 2-ethyl-hexyl, 3-methyl-butyl orthophosphoric acid.

5. The composition of claim 4, wherein the water-soluble alcohol is ethylene glycol.

6. The composition of claim 4, wherein the water-soluble alcohol is ethyl alcohol.

7. The composition of claim 4, wherein the water-soluble alcohol is methanol.

8. The method of inhibiting the corrosion of metals caused by contact with aqueous fluids which consists in neutralizing any acidity of said aqueous fluids, and then adding to the neutralized aqueous fluid at least 0.01 per cent by weight of the sodium salt of 2-ethyl-hexyl, 3-methyl-butyl orthophosphoric acid.

HERSCHEL G. SMITH.
TROY L. CANTRELL.
WILLIAM L. McCLINTOCK, Jr.

REFERENCES CITED

The following references are of record in the file of this patent:

UNITED STATES PATENTS

| Number | Name | Date |
|---|---|---|
| 1,711,324 | Osterlund | Apr. 30, 1929 |
| 2,005,619 | Graves | June 18, 1935 |
| 2,071,482 | Winning et al. | Feb. 23, 1937 |
| 2,080,299 | Benning et al. | May 11, 1937 |
| 2,167,867 | Benning | Aug. 1, 1939 |
| 2,273,781 | Hochwalt | Feb. 17, 1942 |

OTHER REFERENCES

Shriner and Fuson: "The Systematic Identification of Organic Compounds," 2nd edition, John Wiley and Sons, Inc., N. Y. (1940), page 14.